United States Patent [19]
Cohrs et al.

[11] Patent Number: 5,842,161
[45] Date of Patent: Nov. 24, 1998

[54] TELECOMMUNICATIONS INSTRUMENT EMPLOYING VARIABLE CRITERIA SPEECH RECOGNITION

[75] Inventors: Paul Wesley Cohrs; Mitra P. Deldar; Donald Marion Keen; Ellen Anne Keen, all of Indianapolis, Ind.

[73] Assignee: Lucent Technologies Inc., Murray Hill, N.J.

[21] Appl. No.: 668,660

[22] Filed: Jun. 25, 1996

[51] Int. Cl.$^6$ .................................................... G10L 7/08
[52] U.S. Cl. ..................... 704/251; 704/239; 704/244; 704/275
[58] Field of Search ................... 395/2.4, 2.53, 395/2.54, 2.55, 2.56, 2.6, 2.61, 2.84, 2.79; 704/231, 244, 245, 246, 251, 250, 252, 255, 256, 257, 233, 243, 200, 241, 239, 275

[56] References Cited

U.S. PATENT DOCUMENTS

| | | | |
|---|---|---|---|
| 4,481,593 | 11/1984 | Bahler | 395/2.62 |
| 4,489,435 | 12/1984 | Moshier | 395/2.53 |
| 4,972,485 | 11/1990 | Dautrich et al. | 395/2.6 |
| 5,218,668 | 6/1993 | Higgins et al. | 395/2.09 |
| 5,303,299 | 4/1994 | Hunt et al. | 379/88 |
| 5,524,169 | 6/1996 | Cohen et al. | 395/2.4 |
| 5,579,436 | 11/1996 | Chou et al. | 704/244 |
| 5,638,425 | 6/1997 | Meador, III et al. | 379/88 |

OTHER PUBLICATIONS

IEE Proceedings I. Mercier et al., "Recognition of speaker–dependent continuous speech with KEAL". vol: 136, pp. 145–154, Apr. 1989.

ICASSP 88: 1988 International Conference on Acoustics, Speech and Signal Processing. Bahl et al., A new algorithm for the estimation of hidden Markov model parameters. vol. 1, pp. 493–497, Apr. 1988.

*Primary Examiner*—Richemond Dorvil

[57] ABSTRACT

A recognition criterion or set of recognition criteria are updated automatically, over time, in accordance with the speech input of the user(s). Each input utterance is compared to one or more models of speech to determine a similarity metric for each such comparison. A model of speech which most closely matches the utterance is determined based on the one or more similarity metrics. The similarity metric corresponding to the most closely matching model of speech is analyzed to determine whether the similarity metric satisfies the selected set of recognition criteria. The recognition criteria are automatically altered during use or "on-the-fly", so that more appropriate criteria (and associated thresholds) may be used to either increase the probability of recognition or decrease the incidence of false positive results. Illustratively, if a voice sample results in a near miss of a template, a more liberal criterion is thereafter employed to increase the probability of recognition for subsequent input. Parametric histories of recognition and near misses followed by recognition are kept with periodic alteration of the criteria values to correspond to these histories. Additionally, parametric histories of false alarms are maintained and used to update criteria values in combination with recognition histories.

6 Claims, 2 Drawing Sheets

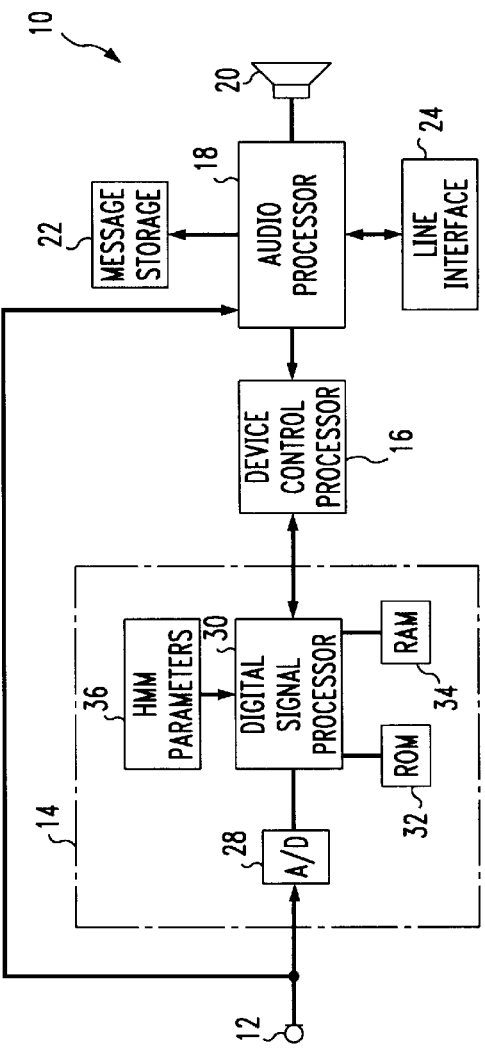

TELECOMMUNICATIONS INSTRUMENT EMPLOYING VARIABLE CRITERIA SPEECH RECOGNITION

REFERENCE TO RELATED APPLICATIONS

This application is related to U.S. application Ser. No. 08/509,681, filed Jul. 31, 1995, submitted by the inventors herein and the disclosure of which application is expressly incorporated herein by reference in its entirety.

BACKGROUND OF THE INVENTION

1. Field of the Invention

The present inventions relates to the field of speech recognition and, for example, to the detection of commands in continuous speech.

2. Description of the Background Art

Command systems, which are responsive to human voice, are highly desirable for a wide variety of consumer products. In a telecommunications instrument, for example, typical operations such as on/off, transmit/receive, volume, push-button dialing, speech recognizer training, and telephone answering device functions may be readily achieved by monitoring an audio input channel and taking appropriate action whenever a specific utterance (the command) appears in the input. For each command to be recognized by the system, a statistical model such, for example, as a template or hidden Markov model (HMM) well known in the art, is maintained. The statistical model defines the likelihood that a given segment of input contains a command utterance.

During its operation, a conventional command spotting system continually generates conjectures or hypotheses about the identities and locations of command words in the currently observed input. Each hypothesis is tested against a respective command model and a score is generated for its respective likelihood. The score may be determined by, for example, conventional Viterbi scoring. If the score exceeds a threshold T, the hypothesis is considered as accepted and the action associated with it is effected. Otherwise, the hypothesis is rejected. The probability distribution of the score of either a correct or a false hypothesis depends on a variety of factors, including the speaker, the transducer, and the accoustical environment. A fixed threshold T is usually set sufficiently high to ensure, for the maximum number of users, an acceptably low false alarm rate over the whole range of expected operating conditions. Unfortunately, due to wide variations in user voice characteristics and environmental conditions, the selected threshold typically functions much better for some users than others.

Users having a low probability of exceeding the threshold may, on a regular basis, be ignored by the system. One technique for addressing the problem of frequently rejected users is directed to reducing the threshold level. Setting the threshold too low, however, typically results in an unacceptably high number of false positive hypotheses for average users.

SUMMARY OF THE INVENTION

According to the present invention, the above-mentioned deficiencies of the prior art are avoided by a variable criteria speech recognition technique suitable for, among other applications, command spotting and isolated word spotting.

A recognition criterion or set of recognition criteria are updated automatically, over time, in accordance with the speech input of the user(s). Each input utterance is compared to one or more models of speech to determine a similarity metric for each such comparison. A model of speech which most closely matches the utterance is determined based on the one or more similarity metrics. The similarity metric corresponding to the most closely matching model of speech is analyzed to determine whether the similarity metric satisfies the selected set of recognition criteria.

In accordance with an illustrative embodiment of the present invention, recognition criteria are automatically altered during use or "on-the-fly", so that more appropriate criteria (and associated thresholds) may be used to either increase the probability of recognition or decrease the incidence of false positive results. Illustratively, if a voice sample results in a near miss of a template, a more liberal criterion may thereafter be employed to increase the probability of recognition for subsequent input. Parametric histories of recognition and near misses followed by recognition are kept with periodic alteration of the criteria values to correspond to these histories. Additionally, parametric histories of false alarms may be maintained and used to update criteria values in combination with recognition histories.

The various features of novelty which characterize the invention are pointed out with particularity in the claims annexed to and forming a part of the disclosure. For a better understanding of the invention, its operating advantages, and specific objects attained by its use, reference should be had to the accompanying drawings and descriptive matter in which there are illustrated and described an illustrative embodiment of the invention.

BRIEF DESCRIPTION OF THE DRAWINGS

The features and advantages of the present invention will be more readily understood from the following detailed description when read in conjunction with the accompanying drawings, in which;

FIG. 1 is a block diagram of an illustrative device configured to utilize automatically updated, multiple threshold speech recognition criteria in accordance with the present invention;

FIG. 2 depicts a block flow diagram depicting the performance of speech recognition to provide a control interface for the illustrative device of FIG. 1.

DETAILED DESCRIPTION OF THE INVENTION

Figure 3:
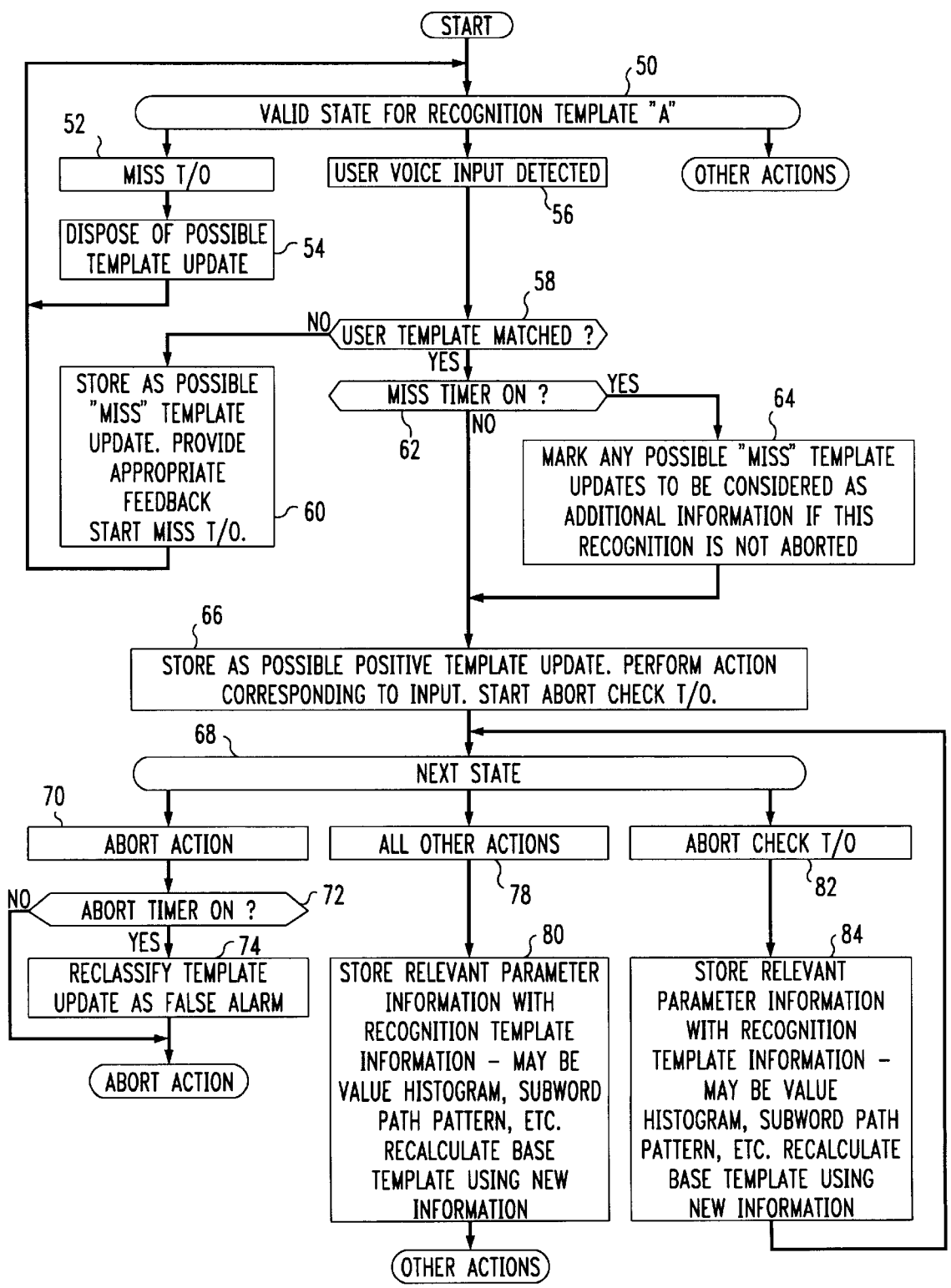
FIG. 3 shows a block flow diagram depicting the process by which a set of criteria and associated thresholds thereof are automatically adjusted in accordance with an illustrative embodiment of the present invention.

For clarity of explanation, the illustrative embodiment of the present invention is presented as comprising individual functional blocks (including functional blocks labeled as "processors"). The functions represented by these blocks may be implemented through the use of either shared or dedicated hardware including, but not limited to, hardware capable of executing software. Illustratively, the functions of the processors presented in FIG. 1 may be implemented by a single shared processor such, for example, as a digital signal processor (DSP). It should be noted, however, that as utilized herein, the term "processor" is not intended to refer exclusively to hardware capable of executing software.

FIG. 1 presents an illustrative embodiment of the present invention which concerns a telephone answering device employing speech recognition. It is also contemplated, however, that the teachings of the present invention are equally applicable to any device in which a voice-operated control interface is desired. For example, the use of progressively adjustable, multiple-threshold criteria for voice recognition in accordance with the present invention may be easily extended to the control of conventional home and business telephones, cordless and cellular telephones, personal data organizers, facsimile machines, computers (such as personal computers) and computer terminals.

In any event, and as shown in FIG. 1, device 10 includes a microphone 12 for receiving input speech from the user, a speech recognition system 14, and a device control processor 16 for directing the operation of the various functioning components of the device 10. In the illustrative embodiment, in which device 10 is configured as an answering machine, these components include an audio processor 18, a speaker 20, a message storage unit 22, and a line interface 24 for receiving and sending audio signals from and to a calling party via a telephone line (not shown).

Audio processor 18 is conventional in the art and performs various functions under the control of the device control processor 16. For example, audio processor 18 receives audio input signals from microphone 12 and line interface 24. Each of these signals is processed as required by any specific telephone system requirements and stored in message storage 22 in an appropriated format, which format may be analog or digital. Processor 18 further directs audio output signals representing, for example, outgoing messages or messages received from a calling party, to line interface 24 or loudspeaker 20, respectively. Furthermore, audio processor 18 encodes messages such, for example, as voice prompts received from the device control processor 16, into audio signals and sends them to speaker 20.

The device control processor 16 may also be of conventional design. As indicated above, processor 16 controls telephone call processing and the general operation of answering machine device 10. Device control processor 16 receives input from and issues control instructions to speech recognition system 14 and the audio processor 18. In a manner which will be explained in more detail later, speech recognition system 14 selects from among multiple recognition criteria to optimize the performance for the individual user(s) thereof. In response to the input of the criteria selection module, the device control processor 16 changes the mode of operation of the speech recognition system 14 by sending appropriate instructions, as explained below.

With continued reference to FIG. 1, it can be seen that speech recognition system 14 comprises a conventional analog-to-digital (A/D) converter 28 to convert the audio signal picked up by the microphone 12 into a stream of digital samples, a digital signal processor 30 such as the AT&T DSP 16A, which processes digital signal samples generated by A/D converter 28; a ROM 32, which contains program instructions executed by the digital signal processor 30 (See FIG. 2); a RAM 34, in which temporary computation results are stored; and an HMM parameter memory 36 which is a nonvolatile memory such, for example, as a EEPROM, ROM, flash RAM, battery backed RAM, etc.) and which, in the illustrative embodiment, contains at least two sets of parameters of hidden Markov models (HMM) for the phrases to be recognized. As will be readily appreciated by those skilled in the art, one or more of devices 28, 30, 32, 34, and 36 may be physically located on the same electronic chip.

Speech recognition system 14 is placed in command spotting mode by a signal from processor 16 indicating that no device control operation initiated by a user is currently pending. In this mode, the system 14 checks each incoming speech utterance from A/D converter 28 for the presence of a command phrase for which one or more HMMs are stored in the HMM parameter memory 36. In other words, in command spotting mode, recognizer 14 employs HMMs in memory 36 which correspond to command phrases such, for example, as "message playback", "record outgoing message", "next message", "rewind", and so on. An utterance from the user is accepted as a command if the presence of such a command phrase is confirmed by the system 14. Otherwise, the utterance is rejected. If the hypothesis is accepted, a signal indicating that a specific command phrase has been detected is sent from speech recognizer 14 to the device control processor 16. Device control processor 16 then initiates the operation associated with the command. If the utterance is rejected, no message is sent to the device control processor 16. The operation of processor 16 in response to accepted commands is conventional within the art.

With reference now to FIG. 2, there is shown a block flow diagram of the processing performed by the digital signal processor 30 of the speech recognition system 14. Each block represents a distinct processing function which is typically implemented as a subroutine of the program stored in ROM 32. The four basic steps involved in the recognition of speech are: feature extraction, time registration, pattern similarity measurement, and decision strategy. Current speech recognition systems use a variety of techniques to perform these basic steps. Each approach has its own performance and cost mix. The typical speech recognition strategy is to "scan" the incoming speech data continuously, perform dynamic programming, compute a similarity measure or "distance" between the utterance spoken and the stored reference patterns, and decide if the similarity measure is sufficiently close to an anticipated value to declare that the utterance is recognized.

With continued reference to FIG. 2, it will be observed that the speech samples provided by A/D converter 28 are processed by conventional speech extractor 40 to produce a stream of vectors of speech features, typically at a rate of 100 to 200 vectors/second. A variety of signal processing techniques exist for representing a speech signal in terms of time varying parameters which are useful for speech recognition. Examples of suitable signal processing transformations are the direct spectral measurement (mediated either by a bank of bandpass filters or by a discrete Fourier transform), the cepstrum, and a set of suitable parameters of a linear predictive model (LPC) (See J. D. Markel and A. H. Gray, Jr., "Linear Prediction of Speech", Springer-Verlag, New York, (1976)). In the illustrative embodiment of FIG. 2, each vector contains 10 to 30 components of speech features relating to speech energy, delta speech energy, cepstrum coefficients, and delta cepstrum coefficients. The stream of feature vectors is processed by conventional endpoint detector 42 which detector determines the beginning and end points of utterances embedded in the speech. The output of the endpoint detector comprises finite sequences of speech vectors, where each sequence of vectors corresponds to a single utterance.

After feature extraction/end point detection, the next basic recognition step is the computation of a similarity measure between a stored reference and the time-normalized parameters extracted from the utterance. To this end, hypothesizer 43 receives the speech vector sequences output by endpoint detector 42 and generates a hypothesis as to their verbal contents. In so doing, the hypothesizer uses HMM models for the phrases, the parameters of which are stored as indicated by phrase model parameters block 44 and HMM background models, the parameters of which are stored as indicated by background model parameters block 45. The term "background" refers to silence, noise, or any speech which is not one of the command phrases. Physically, all of these models are located in the HMM parameters memory 36 of FIG. 1.

Hypothesizer 43 makes two types of hypotheses. The first type of hypothesis (referred to as a "background hypothesis") assumes that the feature vector sequence includes only the background. The second type of hypothesis (referred to as a "phrase hypothesis") assumes that the feature sequence includes a command word, possibly followed or preceded by background. For each of these two hypothesis, the hypothesizer applies a conventional dynamic programming optimization procedure, such as Viterbi decoding (or scoring), which procedure determines the most likely hypothesis of that type and a corresponding numerical value (or score) of the estimated likelihood of the hypothesis.

In addition, the dynamic programming procedure produces some additional parameters for the phrase hypothesis, which parameters are referred to as "match parameters". A first match parameter is generated by forming the difference between an expected phrase duration for the most likely phrase hypothesis and the phrase duration determined by the hypothesizer for the utterance corresponding to the most likely phrase hypothesis. A second match parameter is generated by forming the mean of the absolute value of the difference between expected HMM state durations of the most likely hypothesis and the state durations determined by the hypothesizer 43. A third match parameter is generated by forming the difference between the likelihood scores for the most likely hypothesis of the best phrase hypothesis and the second best phrase hypothesis. As will be readily ascertained by those skilled in the art, data for use in generating match parameters is available as part of conventional speech recognition processes employing, for example, HMMs and Viterbi scoring.

The output of the hypothesizer 43 includes the most likely phrase hypothesis; a corresponding score, which is the difference of the logarithms of the phrase hypothesis likelihood estimate and the background hypothesis likelihood estimate; and the match parameters. The verifier 46 receives the output of the hypothesizer 43 and checks if each of the match parameters is within a corresponding prescribed range. Illustratively, the verifier may be configured to check whether a first match parameter is within, for example, the range —½ to 1, whether a second match parameter is within a range of 100 ms, and whether a third match parameter is within 10% of the best hypothesis score. If each match parameter is within a prescribed range, the verifier passes the hypothesis and its respective scores to the decision maker 47. Otherwise, the hypothesis is rejected.

An illustrative example of the manner in which accept/reject decisions may performed by decision maker 47 in accordance with the teachings of the present invention is phrase hypothesis. If the hypothesis is accepted by the decision maker 47, the hypothesis is reported to the device control processor 16 of FIG. 1. The method by which the decision maker 47 makes its decision is explained in the block flow diagram of FIG. 3.

In accordance with the embodiment of the inventive process depicted in FIG. 3, an initial recognition template is constructed for each command or command segment. Illustratively, a template "A" corresponding to the command "pick-up", may be configured as a voice dependent model or as a subword path based upon the averages of a large number of speakers obtained during training. A library of such templates as template "A" is provided, perhaps initially in ROM 32, with an updated library of templates eventually being developed and stored in RAM 34.

The process is entered at block 50 following the occurrence of some event or the receipt of some input which requires some form of response from device 10. In the case of a telephone, for example, the event may be the detection of a ringing signal or the removal of a telephone handset. The occurrence of such an event constitutes a valid state for an associated recognition template. In the case of template "A", for example, the presence of a ringing signal provides a valid state for the command "pick-up". Speech recognizer 14 looks for any input command that is consistent with the valid state. If no user voice input is detected within a specified time, or, in the illustrative example, the calling party hangs up, the process is aborted (blocks 52 and 54). If a voice input is detected (block 56), however, an input template is generated for that input in a conventional manner for comparison to the current template or templates for which there is a valid state (block 58).

As shown in block 60, if the input template does not match the current template, the former is stored as a possible "miss" template update and, for a purpose which will soon become apparent, a "miss timer" is initiated. If a match is found between the input template and a current template, continuation of the process proceeds in one of two ways depending upon whether or not the "miss" timer is running (block 62). If the "miss" timer is not on, the input template is stored as a possible positive template update (block 66) and an abort timer is initiated. If the "miss" timer is on, any possible "miss" template updates are marked for consideration as additional information, provided the recognition process is not aborted by the user prior to execution of the command (block 64). Such consideration may consist, for example, of similarity evaluations between the potential updates.

As indicated in block 66, an accept/reject decision is output for use by the device control processor 16 in a conventional manner so that an action corresponding to a detected command may be performed by device 10, thereby signifying the entry of a new valid state for a subsequent command or action (block 68). An abort check timer is also initiated. If the user performs some action which is inconsistent with the detected command operation such, for example, as by taking a phone off-hook after a "dial xxxxxxx" command has been detected and executed, execution of the command is halted and, if applicable, any newly created template update is reclassified as a false alarm (blocks 70,72,74,76). Otherwise, both the input positive template and the parametric information associated therewith are stored together (78,80,82,84). Examples of relevant parametric information includes the location of the utterance endpoints, duration of the utterance, and the number of frames in each state. As will be readily appreciated by those skilled in the art, these parameters may be stored as value histograms, subword path patterns, and so on.

Each time a new positive template is received, the criteria represented by the stored parametric information associated with the current template is adjusted using the parametric information associated with the new template to thereby obtain a closer recognition model for the user(s) of device 10. The present invention thus differs from conventional speech recognition systems in that individual recognition criteria are continuously updated without repetitively creating a new template by averaging old and new template values.

From the foregoing, it should be readily ascertained that the invention is not limited by the embodiments described above which are presented as examples only but may be modified in various ways within the intended scope of protection as defined by the appended patent claims.

What is claimed is:

1. A speech recognizer apparatus for recognizing a phrase including at least one word, based upon an utterance by a user, the apparatus comprising:

means for comparing the utterance to at least one speech model to determine at least one similarity metric, wherein said at least one similarity metric corresponds to said at least one speech model;

means for selecting a particular model of speech from said at least one speech model, that most closely matches the utterance based on said at least one similarity metric;

means, responsive to the means for selecting, for determining whether the similarity metric corresponding to said most closely matching model of speech satisfies at least one recognition criterion;

means for recognizing the utterance as a phrase corresponding to said most closely matching model of speech when said at least one recognition criterion is satisfied;

means for storing voice data representative of the utterance, when said at least one recognition criterion is satisfied; and means for automatically adjusting said at least one recognition criterion in accordance with said stored voice data, to thereby increase a probability of recognition for the utterance upon subsequent repetition thereof.

2. The apparatus of claim 1, wherein a model of speech reflects one or more predetermined words.

3. The apparatus of claim 2, wherein a predetermined word comprises a command word for a utilization device.

4. The apparatus of claim 2, further including a utilization device.

5. The apparatus of claim 4, wherein the utilization device is a telephone.

6. The apparatus of claim 4, wherein the utilization device is an answering machine.

* * * * *